US012705910B2

(12) United States Patent
Li et al.

(10) Patent No.: US 12,705,910 B2
(45) Date of Patent: Aug. 11, 2026

(54) SYSTEMS AND METHODS FOR A VISION-LANGUAGE PRETRAINING FRAMEWORK

(71) Applicant: Salesforce, Inc., San Francisco, CA (US)

(72) Inventors: Junnan Li, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 515 days.

(21) Appl. No.: 18/160,722

(22) Filed: Jan. 27, 2023

(65) Prior Publication Data

US 2024/0160853 A1 May 16, 2024

Related U.S. Application Data

(60) Provisional application No. 63/424,413, filed on Nov. 10, 2022.

(51) Int. Cl.

| | |
|---|---|
| ***G06V 20/70*** | (2022.01) |
| ***G06F 40/10*** | (2020.01) |
| ***G06F 40/126*** | (2020.01) |
| ***G06F 40/284*** | (2020.01) |
| ***G06F 40/35*** | (2020.01) |
| ***G06F 40/40*** | (2020.01) |
| ***G06N 20/00*** | (2019.01) |
| ***G06T 9/00*** | (2006.01) |
| ***G06V 10/74*** | (2022.01) |
| ***G06V 10/764*** | (2022.01) |
| ***G06V 10/774*** | (2022.01) |

(52) U.S. Cl.

CPC .............. *G06V 20/70* (2022.01); *G06F 40/10* (2020.01); *G06F 40/126* (2020.01); *G06F 40/284* (2020.01); *G06F 40/35* (2020.01); *G06F 40/40* (2020.01); *G06N 20/00* (2019.01); *G06T 9/00* (2013.01); *G06V 10/74* (2022.01); *G06V 10/764* (2022.01); *G06V 10/774* (2022.01)

(58) Field of Classification Search

None

See application file for complete search history.

(56) References Cited

U.S. PATENT DOCUMENTS

| | | | | |
|---|---|---|---|---|
| 12,198,048 | B2 * | 1/2025 | Singh et al. | G06F 40/20 |
| 2023/0281400 | A1 * | 9/2023 | Wang et al. | G06F 40/284 |

(Continued)

OTHER PUBLICATIONS

Alayrac et al, (Apr. 29, 2022). Flamingo: A visual language model for few-shot learning (Year: 2022).*

(Continued)

*Primary Examiner* — Paras D Shah
*Assistant Examiner* — Nicholas D Lowen
(74) *Attorney, Agent, or Firm* — Haynes and Boone, LLP

(57) ABSTRACT

Embodiments described herein provide a multimodal vision-language model. The multimodal vision-language model contains a Generalist Multimodal Transformer capable of complete multiple tasks using the same set of parameters learning from pre-training. The Generalist Multimodal Transformer allows alignment between frozen, unimodal encoders, such as image encoders and large language models. The Generalist Multimodal Transformer eliminates the need for fine-tuning the image encoders and large language models.

20 Claims, 17 Drawing Sheets

(56) References Cited

U.S. PATENT DOCUMENTS

2023/0368510 A1 11/2023 Chen
2024/0087265 A1 3/2024 Park
2024/0282094 A1* 8/2024 Tsimpoukelli et al. ...................... G06V 10/80

OTHER PUBLICATIONS

Chen et al,"Subject-driven Text-to-Image Generation via Apprenticeship Learning", arxiv (Cornell University), Apr. 14, 2023,pp. 1-18, XP093186354, DOI: 10.48550/arxiv.2304.00186 Retrieved from the Internet: URL:https://arxiv.org/pdf/2304.00186v2 [retrieved on Jul. 16, 2024].
Jia et al., "Taming Encoder for Zero Fine-tuning Image Customization with Text-to-Image Diffusion Models", arxiv.org, Cornell University Library, 201 Olin Library Cornell University Ithaca, NY 14853, Apr. 5, 2023, XP091477959,10 pages.
Li et al.,"BLIP-Diffusion: Pre-trained Subject Representation for Controllable Text-to-Image Generation and Editing", arxiv.org, May 24, 2023, XP093180794, DOI: 10.48550/arxiv.2305.14720 Retrieved from the Internet: URL:https://arxiv.org/pdf/2305.14720v1 [retrieved on Jul. 16, 2024],22 pages.
Ruiz et al.,"DreamBooth: Fine Tuning Text-to-Image Diffusion Models for Subject-Driven Generation", arxiv (Cornell University), Mar. 15, 2023, XP093179964, DOI: 10.48550/arxiv.2208.12242 Retrieved from the Internet: URL:https://arxiv.org/pdf/2208.12242v2 [retrieved on Jul. 16, 2024], 25 pages.
International Search Report and Written Opinion for PCT/US2024/027830, dated Jul. 17, 2024, 14 pages.
Deyao Zhu et al: "MiniGPT-4: Enhancing Vision-Language Understanding with Advanced Large Language Models", arxiv.org, Cornell University Library, 201 Olin Library Cornell University Ithaca, NY 14853, Apr. 20, 2023 (Apr. 20, 2023), XP091490134.
Jean-Baptiste Alayrac et al: "Flamingo: a Visual Language Model for Few-Shot Learning", A arxiv.org, Cornell University Library, 201 Olin Library Cornell University Ithaca, NY 14853, Apr. 29, 2022 (Apr. 29, 2022), XP091210828.
Junnan Li et al: "BLIP-2: Bootstrapping Language-Image Pretraining with Frozen Image Encoders and Large Language Models", arxiv.org, Cornell University Library, 201 Olin Library Cornell University Ithaca, NY 14853, May 1, 2023, XP091498386.
International Search Report and Written Opinion mailed Jul. 19, 2024, International Patent Application No. PCT/US2024/027695, 110 pages.
Alayrac et al., "Flamingo: a Visual Language Model for Few-Shot Learning", DeepMind, Apr. 28, 2022., arXiv: 2204.14198v1, pp. 1-66.

* cited by examiner

Input Image
105a
110
Image Encoder
408
120
Q-Former
Queries
106
410
Fully Connected
412
130b
LLM Decoder
415
Output Text
a Cat Wearing Sunglasses Input Image
105a
110
Image Encoder
Q-Former
Queries
Fully Connected
412
130a
LLM Encoder
a Cat
Prefix Text
414
130b
LLM Decoder
Suffix Text
416
Wearing Sunglasses Receive, from a communication interface, an input image and an input utterance relating to the input image 901

Encode, by an image encoder, the input image into an image representation 903

Transform, by a query transformer, the image representation and a set of queries into a transformed representation 905

Generate, by a pretrained language model, a combined representation from a combination of the transformed representation and the input utterance 907

Generate, by the pretrained language model, a decoded output text based on the combined representation 909

Present, via the communication interface, a response based on the decoded output text in response to the input utterance 911

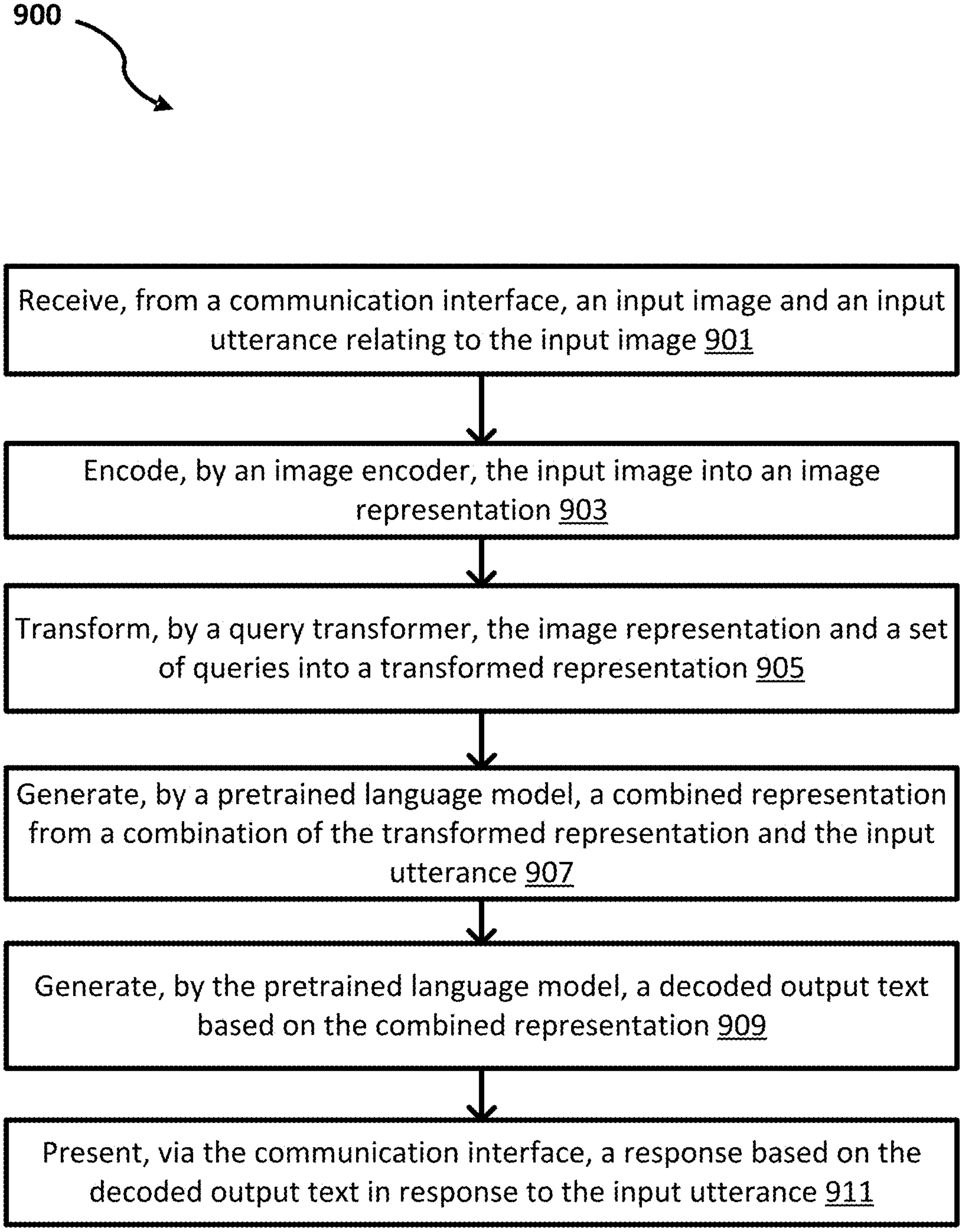

FIG. 9

FIG. 10A
Explain the advantages of this product.
The audi e-tron quattro concept is a plug-in hybrid electric sports car that has a range of 310 miles and can accelerate from 0 to 60 mph in just 4 seconds.
Tell me something about the history of this place.
The great wall of china was built in 221 bc by emperor qin shihuang to protect the emperor's capital from invaders from the north.
Write down the facts that you know about this flower.
It is a genus of flowering plants in the orchid family, orchidaceae. It is native to eastern asia and south east asia. It is a perennial flowering plant that grows up to a height of 1 m.
Is this photo unusual?
Yes, it's a house that looks like it's upside down.
How could someone get out of the house?
It has a slide on the side of the house.
What are shown in the photo?
A man and a chicken.
What does the man feel and why?
He is scared of the chicken because it is flying at him.
What are the ingredients I need to make this?
Pepperoni, mozzarella cheese, pizza sauce, olive oil, salt, pepper, basil.
What is the first step?
Place the pizza dough on a baking sheet, brush with olive oil, sprinkle with salt, pepper, and basil.

| Models | #Trainable Params | Open-sourced? | **Visual Question Answering** VQAv2 (test-dev) | **Image Captioning** NoCaps (val) | | **Image-Text Retrieval** Flickr (test) | |
|---|---|---|---|---|---|---|---|
| | | | VQA acc. | CIDEr | SPICE | TR@1 | IR@1 |
| BLIP | 583M | ✓ | - | 113.2 | 14.8 | 96.7 | 86.7 |
| SimVLM | 1.4B | ✗ | - | 112.2 | - | - | - |
| BEIT-3 | 1.9B | ✗ | - | - | - | 94.9 | 81.5 |
| Flamingo | 10.2B | ✗ | 56.3 | - | - | - | - |
| BLIP-2 | 188M | ✓ | **65.0** | **121.6** | **15.8** | **97.6** | **89.7** |

*Table 1.* Overview of BLIP-2 results on various zero-shot vision-language tasks. Compared with previous state-of-the-art models. BLIP-2 achieves the highest zero-shot performance while requiring the least number of trainable parameters during vision-language pre-training.

FIG. 11

| Models | #Trainable Params | #Total Params | VQAv2 val | VQAv2 test-dev | OK-VQA test | GQA test-dev |
|---|---|---|---|---|---|---|
| VL-T5$_{no\text{-}vqa}$ | 224M | 269M | 13.5 | - | 5.8 | 6.3 |
| FewVLM | 740M | 785M | 47.7 | - | 16.5 | 29.3 |
| Frozen | 40M | 7.1B | 29.6 | - | 5.9 | - |
| VLKD | 406M | 832M | 42.6 | 44.5 | 13.3 | - |
| Flamingo3B | 1.4B | 3.2B | - | 49.2 | 41.2 | - |
| Flamingo9B | 1.8B | 9.3B | - | 51.8 | 44.7 | - |
| Flamingo80B | 10.2B | 80B | - | 56.3 | **50.6** | - |
| BLIP-2 ViT-L OPT$_{2.7B}$ | 104M | 3.1B | 50.1 | 49.7 | 30.2 | 33.9 |
| BLIP-2 ViT-G OPT$_{2.7B}$ | 107M | 3.8B | 53.5 | 52.3 | 31.7 | 34.6 |
| BLIP-2 ViT-G OPT$_{6.7B}$ | 108M | 7.8B | 54.3 | 52.6 | 36.4 | 36.4 |
| BLIP-2 ViT-L FlanT5$_{XL}$ | 103M | 3.4B | 62.6 | 62.3 | 39.4 | 44.4 |
| BLIP-2 ViT-G FlanT5$_{XL}$ | 107M | 4.1B | 63.1 | 63.0 | 40.7 | 44.2 |
| BLIP-2 ViT-G FlanT5$_{XXL}$ | 108M | 12.1B | **65.2** | **65.0** | 45.9 | **44.7** |

*Table 2.* Comparison with state-of-the-art methods on zero-shot visual question answering.

FIG. 12

| Models | #Trainable Params | VQAv2 | |
|---|---|---|---|
| | | val | test-dev |
| *Open-ended generation models* | | | |
| ALBEF | 314M | 75.84 | 76.04 |
| BLIP | 385M | 78.25 | 78.32 |
| OFA | 930M | 82.00 | 82.00 |
| Flamingo80B | 10.6B | 82.00 | 82.10 |
| **BLIP-2** ViT-G $\text{FlanT5}_{XL}$ | 1.2B | 81.44 | |
| **BLIP-2** ViT-G $\text{OPT}_{2.7B}$ | 1.2B | 81.49 | |
| **BLIP-2** ViT-G $\text{OPT}_{6.7B}$ | | | |
| *Closed-ended classification models* | | | |
| VinVL | 345M | 76.52 | 76.60 |
| SimVLM | ~1.4B | 80.03 | 80.34 |
| CoCa | 2.1B | 82.30 | 82.30 |
| BEIT-3 | 1.9B | 84.19 | 84.03 |

FIG. 14

| Models | #Trainable Params | NoCaps Zero-shot (validation set) | | | | | | | | COCO Fine-tuned Karpathy test | |
|---|---|---|---|---|---|---|---|---|---|---|---|
| | | in-domain | | near-domain | | out-domain | | overall | | | |
| | | C | S | C | S | C | S | C | S | B@4 | C |
| OSCAR | 345M | - | - | - | - | - | - | 80.9 | 11.3 | 37.4 | 127.8 |
| VinVL | 345M | 103.1 | 14.2 | 96.1 | 13.8 | 88.3 | 12.1 | 95.5 | 13.5 | 38.2 | 129.3 |
| BLIP | 446M | 114.9 | 15.2 | 112.1 | 14.9 | 115.3 | 14.4 | 113.2 | 14.8 | 40.4 | 136.7 |
| OFA | 930M | - | - | - | - | - | - | - | - | **43.9** | 145.3 |
| Flamingo | 10.6B | - | - | - | - | - | - | - | - | - | 138.1 |
| SimVLM | ~1.4B | 113.7 | - | 110.9 | - | 115.2 | - | 112.2 | - | 40.6 | 143.3 |
| BLIP-2 ViT-G $OPT_{2.7B}$ | 1.1B | 123.0 | 15.8 | 117.8 | 15.4 | 123.4 | **15.1** | 119.7 | 15.4 | 43.7 | **145.8** |
| BLIP-2 ViT-G $OPT_{6.7B}$ | 1.1B | **123.7** | 15.8 | 119.2 | 15.3 | 124.4 | 14.8 | 121.0 | 15.3 | 43.5 | 145.2 |
| BLIP-2 ViT-G $FlanT5_{XL}$ | 1.1B | **123.7** | **16.3** | **120.2** | **15.9** | **124.8** | **15.1** | **121.6** | **15.8** | 42.4 | 144.5 |

FIG. 15

| Model | #Trainable Params | Flickr30K Zero-shot (1K test set) Image → Text R@1 | R@5 | R@10 | Text → Image R@1 | R@5 | R@10 | COCO Fine-tuned (5K test set) Image → Text R@1 | R@5 | R@10 | Text → Image R@1 | R@5 | R@10 |
|---|---|---|---|---|---|---|---|---|---|---|---|---|---|
| *Dual-encoder models* | | | | | | | | | | | | | |
| CLIP | 428M | 88.0 | 98.7 | 99.4 | 68.7 | 90.6 | 95.2 | - | - | - | - | - | - |
| ALIGN | 820M | 88.6 | 98.7 | 99.7 | 75.7 | 93.8 | 96.8 | 77.0 | 93.5 | 96.9 | 59.9 | 83.3 | 89.8 |
| FILIP | 417M | 89.8 | 99.2 | 99.8 | 75.0 | 93.4 | 96.3 | 78.9 | 94.4 | 97.4 | 61.2 | 84.3 | 90.6 |
| Florence | 893M | 90.9 | 99.1 | - | 76.7 | 93.6 | - | 81.8 | 95.2 | - | 63.2 | 85.7 | - |
| BEIT-3 | 1.9B | 94.9 | 99.9 | **100.0** | 81.5 | 95.6 | 97.8 | 84.8 | 96.5 | 98.3 | 67.2 | **87.7** | **92.8** |
| *Fusion-encoder models* | | | | | | | | | | | | | |
| UNITER | 303M | 83.6 | 95.7 | 97.7 | 68.7 | 89.2 | 93.9 | 65.7 | 88.6 | 93.8 | 52.9 | 79.9 | 88.0 |
| OSCAR | 345M | - | - | - | - | - | - | 70.0 | 91.1 | 95.5 | 54.0 | 80.8 | 88.5 |
| VinVL | 345M | - | - | - | - | - | - | 75.4 | 92.9 | 96.2 | 58.8 | 83.5 | 90.3 |
| *Dual encoder + Fusion encoder reranking* | | | | | | | | | | | | | |
| ALBEF | 233M | 94.1 | 99.5 | 99.7 | 82.8 | 96.3 | 98.1 | 77.6 | 94.3 | 97.2 | 60.7 | 84.3 | 90.5 |
| BLIP | 446M | 96.7 | **100.0** | **100.0** | 86.7 | 97.3 | 98.7 | 82.4 | 95.4 | 97.9 | 65.1 | 86.3 | 91.8 |
| **BLIP-2** ViT-L | 474M | 96.9 | **100.0** | **100.0** | 88.6 | 97.6 | **98.9** | 83.5 | 96.0 | 98.0 | 66.3 | 86.5 | 91.8 |
| **BLIP-2** ViT-G | 1.2B | **97.6** | **100.0** | **100.0** | **89.7** | **98.1** | **98.9** | **85.4** | **97.0** | **98.5** | **68.3** | **87.7** | 92.6 |

FIG. 16

SYSTEMS AND METHODS FOR A VISION-LANGUAGE PRETRAINING FRAMEWORK

CROSS REFERENCE

The instant application is a nonprovisional of and claims priority to 35 U.S.C. 119 to U.S. provisional application No. 63/424,413, filed Nov. 10, 2022.

This application is related to U.S. nonprovisional application Ser. No. 18/160,664, filed Jan. 27, 2023.

The aforementioned applications are hereby expressly incorporated by reference herein in their entirety.

TECHNICAL FIELD

The embodiments relate generally to natural language processing and machine learning systems, and more specifically to systems and methods for a vision-language pretraining framework that bootstraps language-image pre-training with frozen image encoders and large language models.

BACKGROUND

Machine learning systems have been widely used in vision-language models. The vision-language models attempt to jointly understand both vision and language to perform tasks such as visual question answering, image captioning, image-text retrieval, and/or the like. These models often receive an image or sample language and output relevant language or an associated image, respectively. For example, a vision-language model may be trained to receive an input image and generate a text caption of the input image. For another example, a vision-language model may be trained to receive a text description of a visual scene and generate an image reconstructing the described visual scene. Some models can only take as input language or images and output the other. Existing vision-language models mostly are only tuned to perform a single task per model, e.g., caption generation, image classification, etc., referred to as "unimodal." As the pretrained vision-language models have been developed with increasingly large scales, the extensive end-to-end training with large-scale models and datasets result in high computation costs.

Therefore, there is a need for training efficiency and expanded capabilities of vision-language models.

BRIEF DESCRIPTION OF THE DRAWINGS

FIG. 9 is an example logic flow diagram illustrating a method of zero-shot vision-language tasks based on the framework shown in FIGS. 1-7, according to some embodiments described herein.

FIGS. 11-16 provide various data tables illustrating data experiment performance of the pretraining vision-language network described in FIGS. 1-9, according to embodiments described herein.

Figure 1:
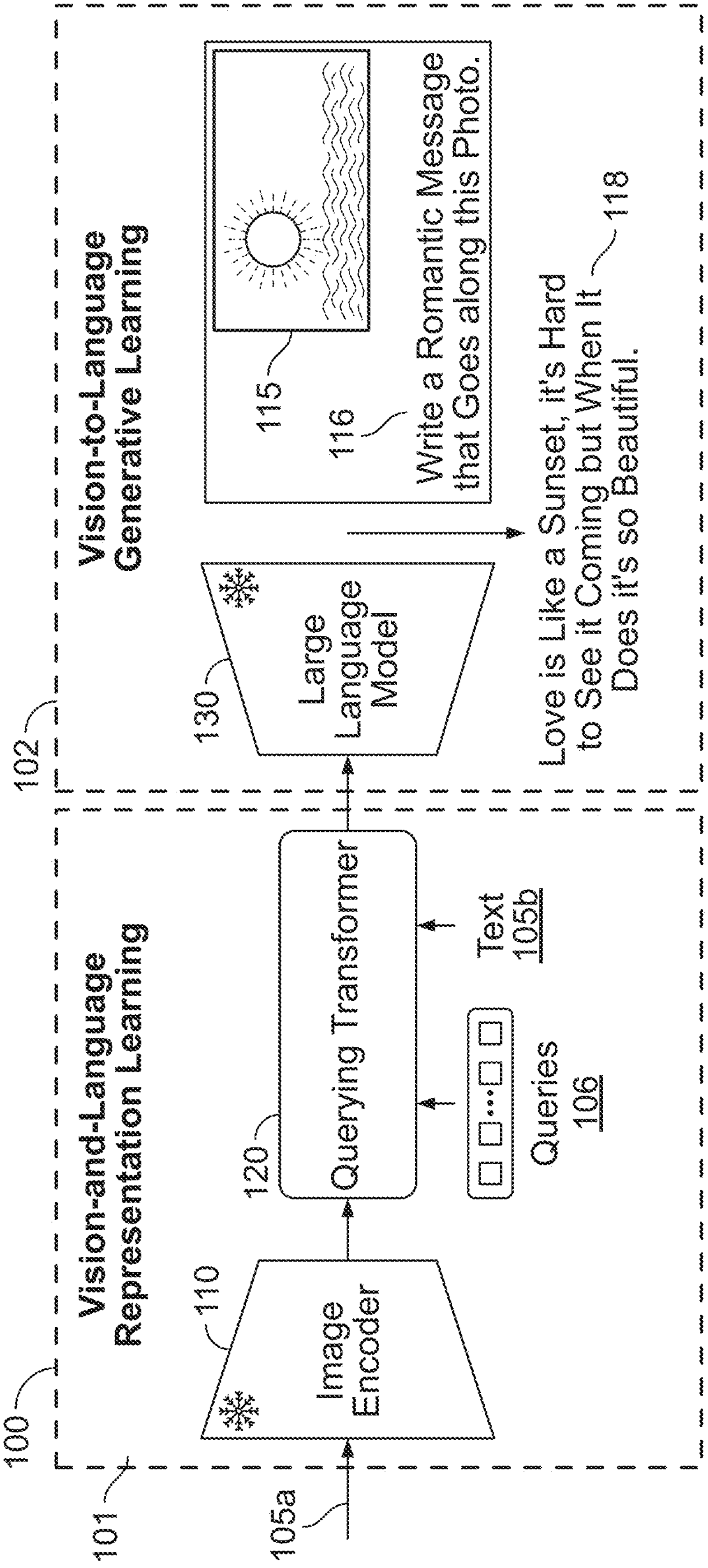
FIG. 1 is a simplified block diagram illustrating an example architecture of the two-stage vision-language pretraining framework, according to embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Traditionally, vision-language pre-training often entails end-to-end training of the entire model on large image-text pair datasets. When the scale of both the datasets and the models increases due to performance demand, the traditional end-to-end framework would incur significant computational cost, resulting in low scalability of the vision-language model.

In view of the need for efficiency and multifunctionality in vision-language models, embodiments described herein provide a training framework for a multimodal vision-language model comprising an image encoder, a query Transformer, and a pre-trained language model. The lightweight query Transformer is the only trainable module in the framework. Thus, training efficiency can be greatly improved.

Specifically, a two-stage pre-training framework may be deployed. In the first stage, the pretrained image encoder encodes an input image into an image representation, and the query Transformer applies attentions over the image representation, queries and/or an input text (e.g., caption of the input image). Three objective, such as image-text matching, image-text contrastive learning and image-grounded text generation, may be jointly optimized by updating the parameters of the query Transformer and the queries but freezing the pretrained image encoder. At the second stage, the pretrained language model generates a decoded output text based on the output from the query Transformer. The decoded output text is then compared with the input text to compute a loss, based on which the query Transformer is updated while freezing both the pretrained language model and the image encoder.

In this way, the pretraining framework is generic and compute-efficient by bootstrapping from already-pre-trained vision models (image encoders) and language models. Pre-trained vision models offer high-quality visual representation. Pre-trained language models, in particular large language models (LLMs), offer strong language generation and zero-shot transfer abilities. To reduce computation cost and counteract the issue of catastrophic forgetting, the unimodal pre-trained models remain frozen during the pre-training. The resulting multimodal vision-language model comprising the unimodal modules (the image encoder and the language mode) and the query Transformer may achieve multifunctionality in vision-language tasks, with relatively light-weight training only at the query Transformer.

In one embodiment, after the two-stage pretraining, at inference stage, the multimodal vision-language model may be put to various vision-language tasks, such as visual question answering, image captioning, image-text retrieval, and/or the like. For example, the multi-modal vision-language model may generate a text response to a text question accompanying an input image. For instance, the model may receive an image of a car and an input text "explain the advantage of this product," and generates a response "the audi e-tron quattro concept is a plug-in hybrid electric sports car." To achieve this, the image encoder and the query Transformer encode and Transform the input image into an image representation. The pretrained language model further encodes a combination of the image representation and the input text and the generates a decoded output text from the encoded representation.

Overview

FIG. 1 is a simplified block diagram illustrating an example architecture of the two-stage vision-language pre-training framework 100, according to embodiments described herein. The multi-modal vision-language model that comprises an image encoder 110, a query Transformer 120 and a (large) language model (LLM) 130 may be trained by the vision-language pretraining framework 100.

Specifically, the unimodal models such as the image encoder 110 and the language model 130 are frozen during the training. The query Transformer 120 is a lightweight transformer which employs a set of learnable query vectors 106 to extract visual features from the frozen image encoder 110. In other words, the query Transformer 120 acts as an information bottleneck between the frozen image encoder 110 and the frozen LLM 130, where it feeds the most useful visual feature from an input image 105*a* for the LLM 130 to output the desired text. For example, the query Transformer 120 may contain 188M parameters, which is relatively much fewer parameters to update compared to an LLM or image encoder.

The pretraining framework 100 comprises two stages 101 and 102. In the first pre-training stage 101, vision-language representation learning enforces the query Transformer to learn visual representation that is most relevant to the text. During the first stage, only the query Transformer 120 and the queries 106 are updated while the image encoder 110 is frozen. Additional details of vision-language representation learning at stage 101 is described below in relation to FIGS. 2-3.

In the second pre-training stage 102, vision-to-language generative learning is performed by connecting the output of the updated query Transformer 120 to an LLM 130 that generates an output text. The query Transformer 120 is again trained such that its output visual representation can be interpreted by the LLM 130. During the second stage, again only the query Transformer 120 and the queries 106 are updated while the image encoder 110 and the LLM 130 are frozen. Additional details of vision-language generative learning at stage 102 is described below in relation to FIGS. 4A-4B.

After the two stages 101-102 of training, the multimodal vision-language model of the frozen image encoder 110, trained query Transformer 120 and the frozen LLM 130 may be used to perform a number of vision-language tasks with zero-shot fine-tuning. For example, given an input image 115 and a guided text 116, the overall multimodal vision-language model may generate a response text 118 according to the guided text 116. Additional details of the multimodal vision-language model at inference stage is described below in relation to FIG. 5.

Figure 2:
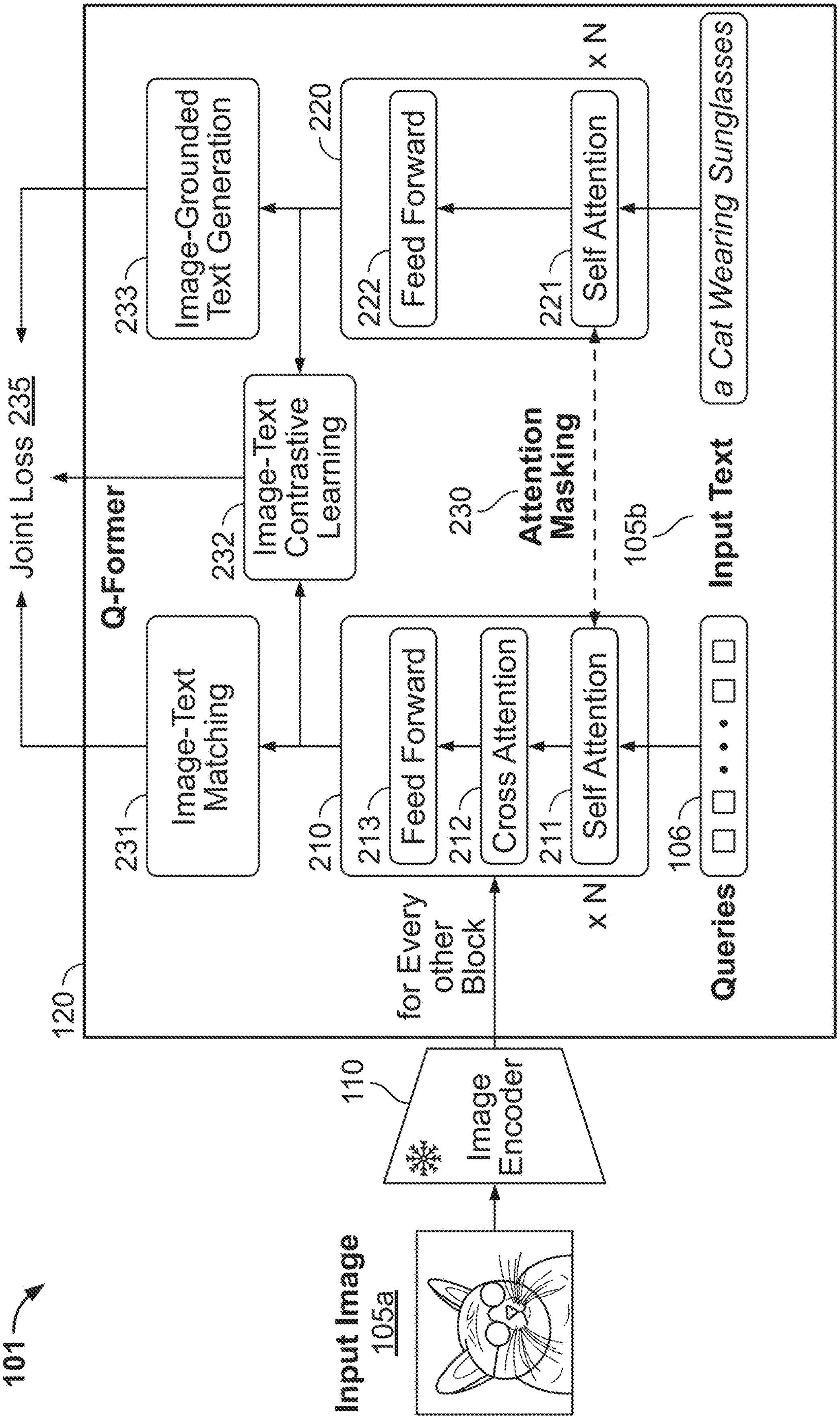
FIG. 2 is a simplified block diagram illustrating an example architecture for the first stage in the two-stage vision-language pretraining framework described in FIG. 1, according to embodiments described herein.

FIG. 2 is a simplified block diagram illustrating an example architecture for the first stage 101 in the two-stage vision-language pretraining framework 100 described in FIG. 1, according to embodiments described herein. As shown in FIG. 2, the query Transformer 120 consists of two transformer submodules 210 and 220 that share the same self-attention layers 211 and 221: (1) an image transformer 210 that interacts with the frozen image encoder 110 for visual feature extraction, (2) a text transformer 220 that can function as both a text encoder and a text decoder.

Specifically, an input image 105*a* may be encoded by the image encoder 110 into image representations. For example, the input image 105*a* may be taken from a pre-training dataset. The pre-training dataset may comprise 129M images in total, including COCO (Lin et al., COCO: common objects in context, Proceedings of European Conference on Computer Vision (ECCV), volume 8693, pp. 740-755, 2014), Visual Genome (Krishna et al., Visual genome: Connecting language and vision using crowdsourced dense image annotations, Proceedings of International Journal on Computer Vision (IJCV), 123(1):32-73, 2017), CC3M (Sharma et al., Conceptual captions: A cleaned, hypernymed, image alt-text dataset for automatic image captioning, Proceedings of Annual Conference on Learning (ACL), pp. 2556-2565, 2018), CC12M (Changpinyo et al., Conceptual 12M: Pushing web-scale image-text pre-training to recognize long-tail visual concepts, Proceedings of Computer Vision and Representation (CVPR), 2021), SBU (Ordonez et al., Im2text: Describing images using 1 million captioned photographs, Proceedings of NIPS, pp. 1143-1151, 2011), and 115M images from the LAION400M dataset (Schuhmann et al., Laion-400 m: Open dataset of clipfiltered 400 million image-text pairs, arXiv:2111.02114, 2021). The CapFilt method, which is described in co-pending and commonly owned U.S. nonprovisional application Ser. No. 17/745,540, filed May 16, 2022, may be applied to create synthetic captions for the web images. For example, 10 captions may be generated using the $BLIP_{large}$ captioning model, and rank the synthetic captions along with the original web caption based on the image-text similarity produced by a CLIP ViT-L/14 model. The top-two captions are kept per image as input text 105*b* and randomly sample one at each pre-training step.

In one implementation, the image encoder 119 may be pre-trainedvision transformer models, such as ViT-L/14 from CLIP (Radford et al., Learning transferable visual models from natural language supervision, arXiv preprint arXiv:2103.00020, 2021), ViT-G/14 from EVA-CLIP (Fang et al., Eva: Exploring the limits of masked visual representation learning at scale, arXiv preprint arXiv:2211.07636, 2022). For example, the last layer is removed from the ViT and the penultimate layer's output features are used.

In one embodiment, the image representation from the image encoder 110 is then passed to the image transformer 210 comprising a stack of transfer blocks. A fixed number of learnable query embeddings ("queries") 106 are input to the image transformer 210. The queries 106 are also tunable, which may be deemed as parameters of the query Transformer 106 and updated with the query Transformer 106 during training.

The queries 106 interact with each other through self-attention layers 211 to produce self-attention outputs. In one implementation, the queries 106 may additionally interact with the input text 105*b* through the same self-attention layers 221, e.g., via attention masking 230.

The self-attention outputs then interact with frozen image features, e.g., the image representation from the frozen image encoder 110, through cross-attention layers 212 to produce cross-attention outputs. In one implementation, the cross-attention layers 212 may be inserted every other transformer block. For example, the query Transformer 120 may be initialized with the pre-trained weights of BERTbase (see Devlin et al., BERT: pre-training of deep bidirectional transformers for language understanding, NAACL, pp. 4171-4186, 2019), whereas the cross-attention layers are randomly initialized.

The cross-attention outputs may be passed through a feed forward layer 213 that generates the output query representation/embedding Z as a transformed image representation for the input image 105*a*. For example, 32 queries may be employed, where each query has a dimension of 768 (same as the hidden dimension of the query Transformer 120). The size of Z (32×768) is much smaller than the size of frozen image features (e.g. 257×1024 for ViT-L/14).

On the other hand, the text transformer 220 receives and encodes the input text 105*b*. Specifically, text tokens in the input text 105*b* interact with each other through self-attention layers 221 to produce self-attention outputs.

Different vision-language objectives are then adopted into forcing the queries 106 to extract visual information from the image representation that is most relevant to the text 105*b*. In one implementation, the text tokens may additionally interact with the queries 106 through the attention masking 230. A feed forward layer 222 may then generate a text representation from the self-attention outputs.

In one embodiment, the query representation Z and the text representation may further be used to compute different pre-training objectives that share the same input format and model parameters. Each objective employs a different attention masking strategy between queries and text to control their interaction, as further shown in FIG. 3.

In one embodiment, Image-Text Matching (ITM) module 231 finetune the alignment between image and text representation. The ITM module 231 may comprise a binary classifier head that predict whether an image-text pair 105*a* and 105*b* is positive (matched) or negative (unmatched) based on the query representation Z and the text representation.

Figure 3:
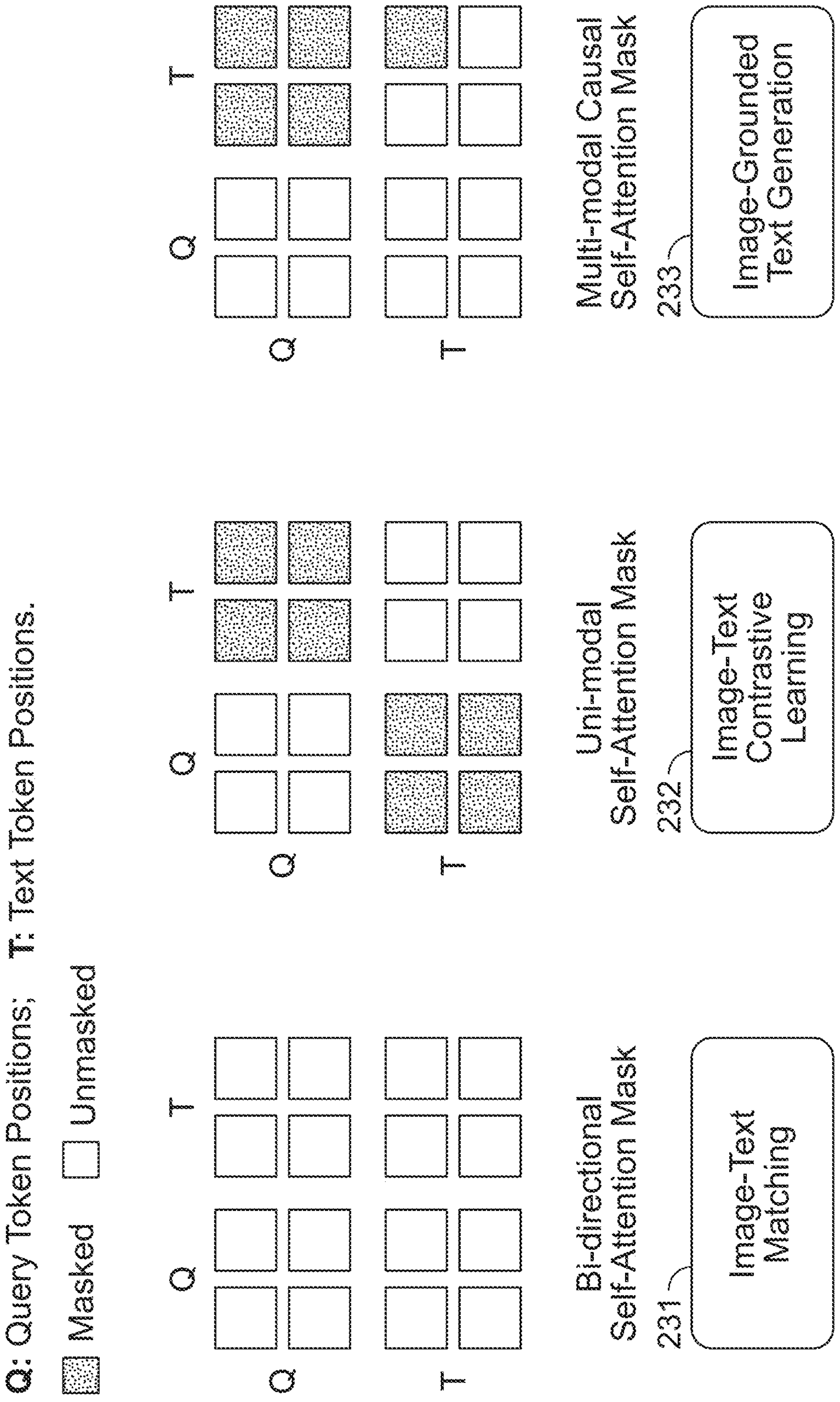
FIG. 3 is a simplified block diagram illustrating example self-attention masks used at the first stage of pretraining as shown in FIG. 2, according to embodiments described herein.

For the ITM objective 231, as shown in FIG. 3, a bi-directional self-attention mask where all queries and texts can attend to each other, is used. The output query embeddings Z thus capture multimodal information. Each output query embedding is fed into the binary classifier head in the ITC module 231 to obtain a logit, and the logits are averaged across all queries as the output matching score. The output matching score is then compared with the ground truth (match or unmatched) to compute an ITM loss.

Referring back to FIG. 2, the Image-Text Contrastive Learning (ITC) module 232 learns to align the image representation and the text representation such that their mutual information is maximized. For example, the ITC module 231 may compute an image-text similarity based on the query representation Z from the image transformer 210 and the text representation t from the text transformer 220. The image-text similarity of a positive pair may then be contrasted against those of negative pairs. In this way, the query representation Z from the image transformer 210 is aligned with the text representation t from the text transformer 220, where t is the output embedding of the [CLS] token. As Z contains multiple output embeddings (one from each query), the pairwise similarity between each query output and t may be computed, and the highest one is selected as the image-text similarity between Z and t. A contrastive loss may then be computed based on the similarities between Z and t.

To avoid information leak, a bi-directional unimodal self-attention mask, where the queries and text are not allowed to attend to each other, may be applied for the ITC objective 232, as shown in FIG. 3. Due to the use of a frozen image encoder 110, more samples may be fitted per GPU compared to end-to-end training methods. Therefore, in-batch negatives are used instead of a momentum queue as described in co-pending and commonly-owned U.S. non-provisional application Ser. No. 17/745,540, filed May 16, 2022.

Referring back to FIG. 2, the Image-grounded Text Generation (ITG) module 233 comprises a decoder head to generate a predicted text conditioned on the image 105*a*. Since the architecture of query Transformer 120 does not allow direct interactions between the frozen image encoder 110 and the text tokens in input text 105*b*, the information required for generating the text is first extracted by the queries 106, and then passed to the text tokens via self-attention layers 230. Therefore, the queries 106 are forced to extract visual features that capture all the information about the text.

As shown in FIG. 3, a multimodal causal self-attention mask is applied for ITG 233 to control query-text interaction. The queries 106 can attend to each other but not the text tokens. Each text token can attend to all queries and its previous text tokens. The [CLS] token is also replaced with a new [DEC] token as the first text token to signal the decoding task. The ITG module 233 generates a predicted text, which is compared with the input text 105*b* to compute a ITG loss.

Referring back to FIG. 2, the ITM loss computed from ITM module 231, the ITC loss computed from ITC module 232 and the ITG loss computed from ITG module 233 are then combined to compute a joint loss 235, which is used to backpropagate and update parameters of the query Transformer 120 while keeping the image encoder 110.

Figure 4A:
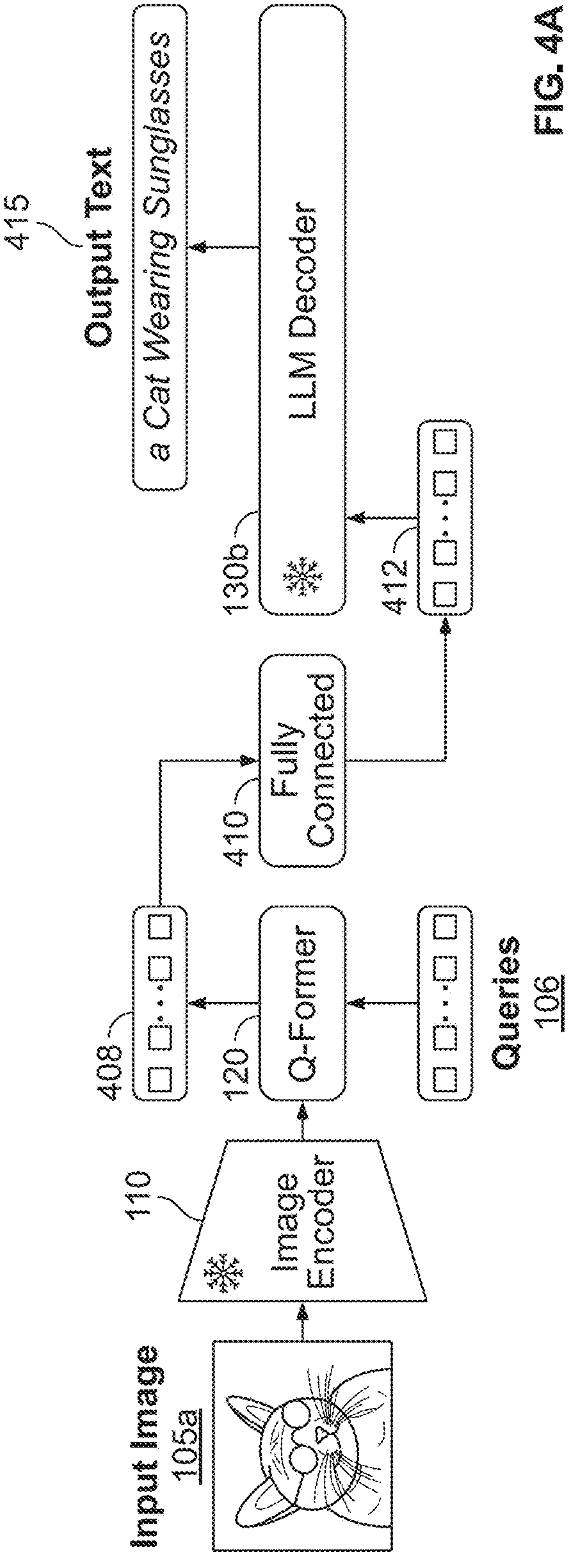
FIGS. 4A-4B are simplified block diagrams illustrating alternative embodiments of an example architecture for the second stage in the two-stage vision-language pretraining framework described in FIG. 1, according to embodiments described herein.
Figure 4B:
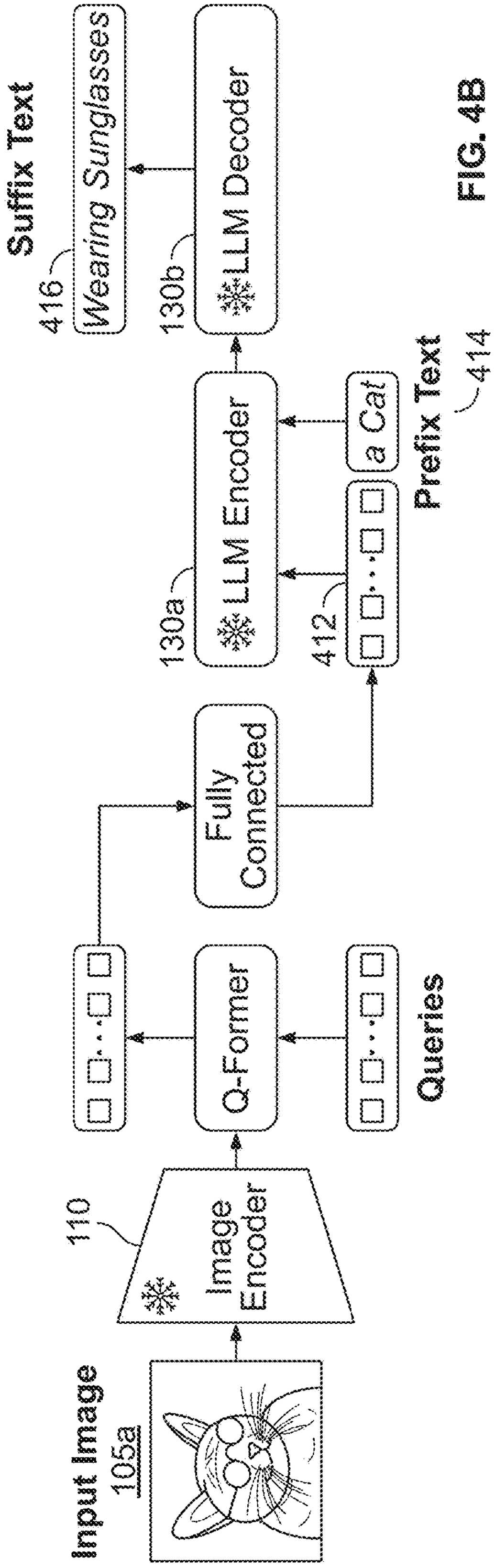

FIGS. 4A-4B are simplified block diagrams illustrating alternative embodiments of an example architecture for the second stage in the two-stage vision-language pretraining framework described in FIG. 1, according to embodiments described herein. In the generative pre-training stage 102, the query Transformer 120 (with the frozen image encoder 110 attached) is connected to a frozen LLM 130 to harvest the LLM's generative language capability.

For example, the LLM 130 may be the unsupervised-trained OPT model family (Zhang et al., OPT: open pre-trained transformer language models, arXiv preprint arXiv: 2205.01068, 2022) for decoder-based LLMs show in FIG. 4A, or the instruction-trained FlanT5 model family (Chung et al., Scaling instruction-finetuned language models, arXiv preprint arXiv:2210.11416, 2022) for encoder-decoder-based LLMs shown in FIG. 4B.

As shown in both FIGS. 4A-4B, a fully-connected (FC) layer 410 is connected to linearly project the output query embeddings Z 408 into embeddings 412 having the same dimension as the word embedding of the LLM 130. The projected query embeddings 412 are then prepended to the input text embeddings. The projected embeddings 412 function as soft visual prompts that condition the LLM 130 on visual representation extracted by the query Transformer 120. Since the query Transformer 120 has been pre-trained during stage 101 shown in FIG. 2 to extract language-informative visual representation, it effectively functions as an information bottleneck that feeds the most useful information to the LLM 130 while removing irrelevant visual information. This reduces the burden of the LLM to learn vision-language alignment, thus mitigating the catastrophic forgetting problem.

FIG. 4A adopts a decoder-based LLM 130*b*. For decoder-based LLMs 130*b*, the LLM decoder 130*b* receives the projected embedding 412, and generate a decoded output text 415 conditioned on the visual representation 412 from the query Transformer 120. Specifically, the decoded output text 415 may be decoded token by toke, and previously generated tokens may be fed to the LLM decoder 130*b* such that the next token in the output text 415 may be generated conditioned on both the projected embedding 412 and the previously decoded tokens. A language modeling loss may be computed as a cross-entropy loss between the decoded output text 415 and the ground-truth text 105*b* (shown in FIG. 1). The language modeling loss is then used to back-propagate the framework to update the query Transformer 120, while both the LLM decoder 130*b* and the image encoder 110 are kept frozen.

FIG. 4B adopts an encoder-decoder-based LLM comprising the LLM encoder 130*a* and LLM decoder 130*b*. For encoder-decoder LLMs 130*b*, the LLM encoder 130*a* may receive both a prefix text 414 and the projected embedding 412 and encode a concatenation of 412 and 414 into an encoded representation. The prefix text 414 may be obtained by splitting the input text 105*b* into two parts. The LLM decoder 130*b* may then generate a decoded suffix text 416 based on the encoded representation. A prefix language modeling loss may be computed by comparing the suffix text 416 and the second part of the input text 105*b* (minus the prefix text). The prefix language modeling loss is then used to backpropagate the framework to update the query Transformer 120, while the LLM encoder 130*a*, LLM decoder 130*b* and the image encoder 110 are kept frozen.

Figure 5:
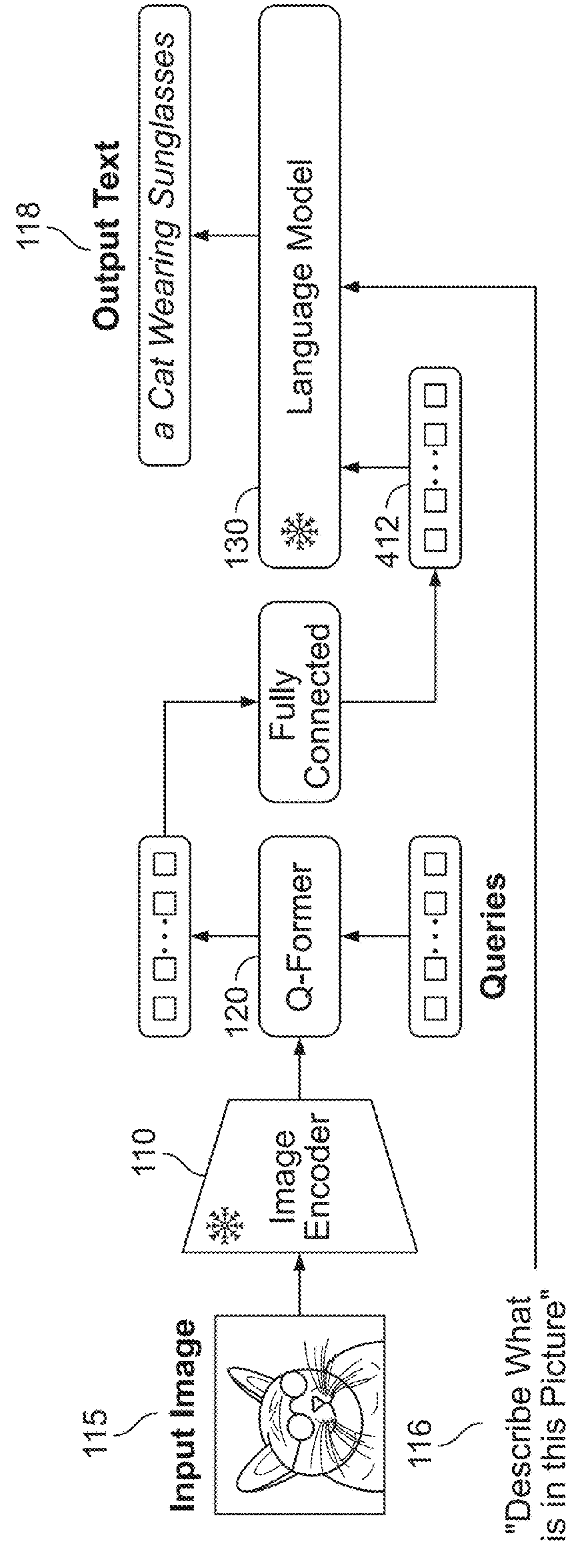
FIG. 5 is a simplified block diagram illustrating applying the pretrained multimodal vision-language model after the two-stage pretraining described in relation to FIGS. 1-4B for performing a vision-language task, according to embodiments described herein.

FIG. 5 is a simplified block diagram illustrating applying the pretrained multimodal vision-language model after the two-stage pretraining described in relation to FIGS. 1-4B for performing a vision-language task, according to embodiments described herein. The framework comprises the image encoder 110, a trained query Transformer 120 (that is trained as described in relation to FIGS. 1-4B), and a LLM 130 (which can be either the decoder-based LLM 130*b* or the encoder-decoder-based LLM 130*a-b* shown in FIGS. 4A-4B).

An input image 115 may be passed through the image encoder 110 and the query Transformer 120 and the fully connected layer to result in the visual embedding 412, in a similar manner as described in FIGS. 1-4B.

In one embodiment, a text 116 may be received accompanying the input image 115, providing guidance on text generation. For example, the text 116 may comprise a question or a request, such as "describe what is in this picture". The text 116 may then be prepended to the projected embeddings 412 and input to the LLM 130. The LLM 130 may then generate an output text 118 conditioned on the visual representation of the input image 115 and the guided text 116. For example, the output text 118 responds to the guided request 116 of "describe what is in this picture".

Figure 10A:
FIGS. 10A-10B provide additional examples of zero-shot image-to-text generation using the framework illustrated in FIG. 5, according to embodiments described herein.
Figure 10B:
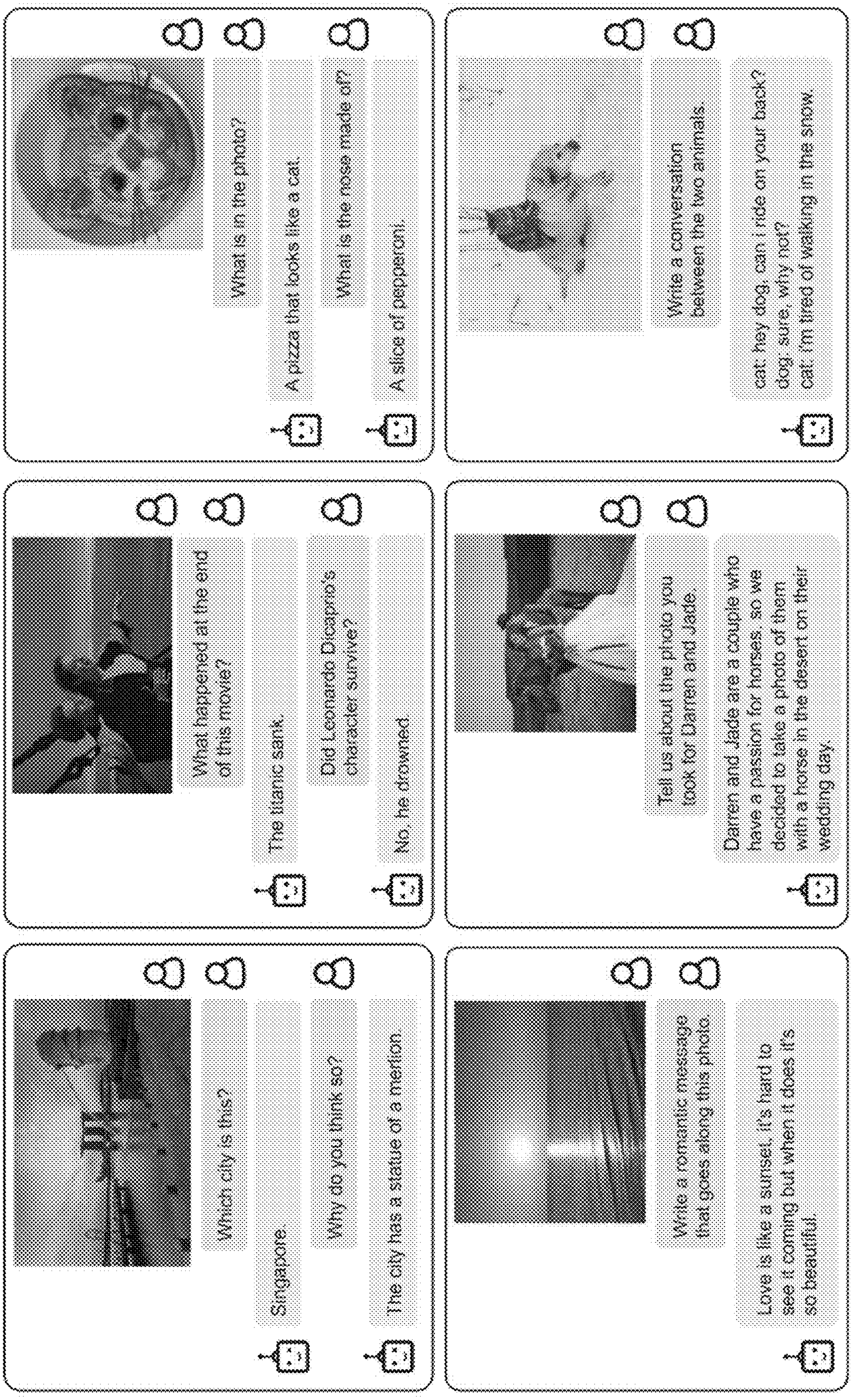

Therefore, the framework described in FIG. 5 may be used to perform a number of vision-language tasks, such as visual question answering, image captioning, image-text retrieval, and/or the like. Specifically, FIGS. 10A-B provide various examples of visual question answering using the framework described here.

It is to be noted that although FIGS. 1-5 show a single input image 105*a* or 115, multiple images may be used as an input. For example, during the training stage, one training sample may comprise multiple images and an accompanying text. The multiple training images may be encoded in a similar way as the example embodiment of a single training image described in relation to FIG. 2. During the inference stage, multiple testing images may be received with the guided text. For example, the multiple images may describe continuous movement of an object such as a "cat" jumping from the ground onto the "sofa," and the guided text may be a request to "describe what happened in the above images," and the vision-language model may encode the multiple images together, and generate an output text of "a cat jumps from the carpet to a sofa."

Computer and Network Environment

Figure 6:
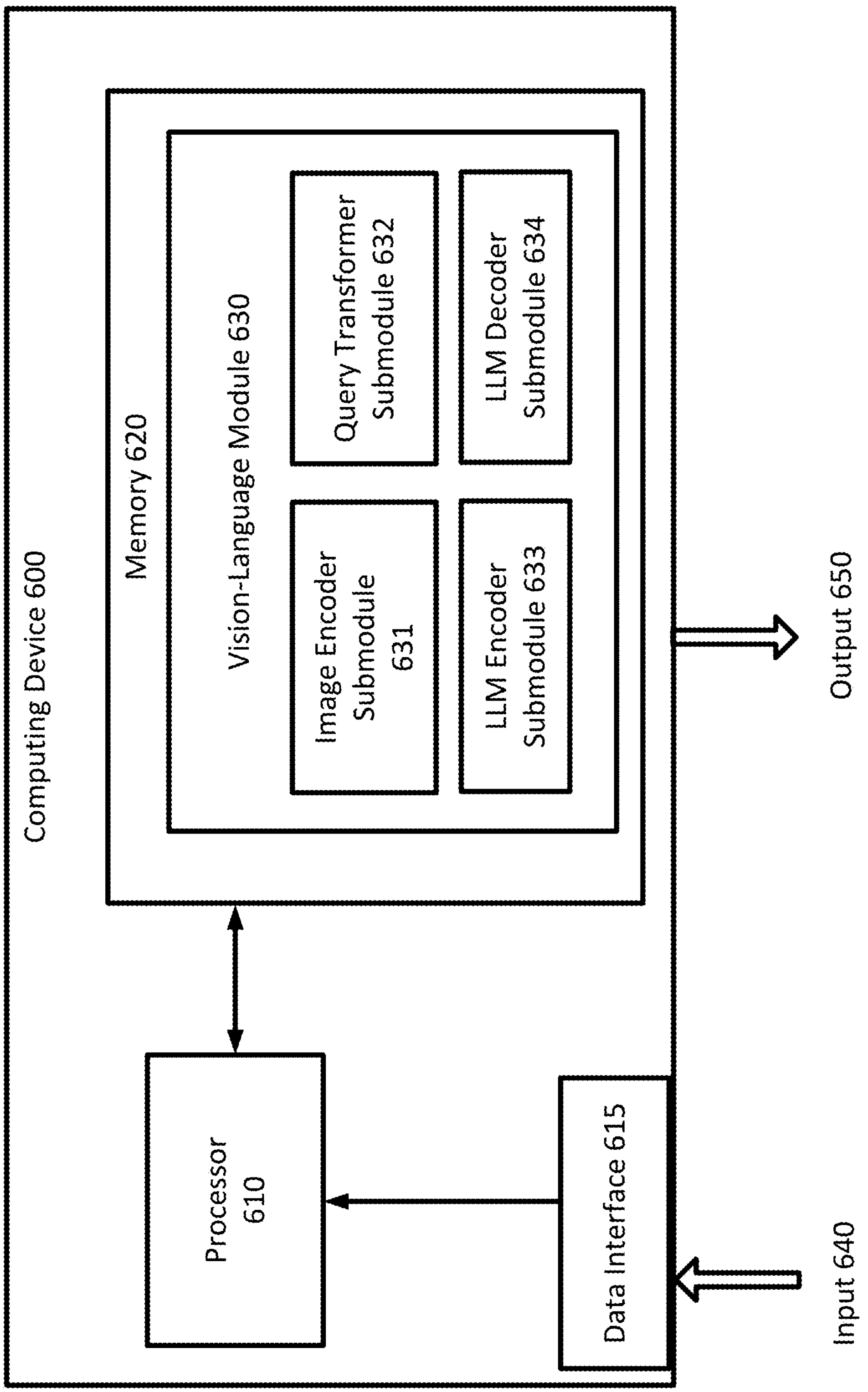
FIG. 6 is a simplified diagram illustrating a computing device implementing the vision-language pretraining framework described in FIGS. 1-5, according to one embodiment described herein.

FIG. 6 is a simplified diagram illustrating a computing device implementing the vision-language pretraining framework described in FIGS. 1-5, according to one embodiment described herein. As shown in FIG. 6, computing device 600 includes a processor 610 coupled to memory 620. Operation of computing device 600 is controlled by processor 610. And although computing device 600 is shown with only one processor 610, it is understood that processor 610 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 600. Computing device 600 may be implemented as a stand-alone subsystem, as a board added to a computing device, and/or as a virtual machine.

Memory 620 may be used to store software executed by computing device 600 and/or one or more data structures used during operation of computing device 600. Memory 620 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 610 and/or memory 620 may be arranged in any suitable physical arrangement. In some embodiments, processor 610 and/or memory 620 may be implemented on a same board, in a same package (e.g., system-in-package), on a same chip (e.g., system-on-chip), and/or the like. In some embodiments, processor 610 and/or memory 620 may include distributed, virtualized, and/or containerized computing resources. Consistent with such embodiments, processor 610 and/or memory 620 may be located in one or more data centers and/or cloud computing facilities.

In some examples, memory 620 may include non-transitory, tangible, machine readable media that includes executable code that when run by one or more processors (e.g., processor 610) may cause the one or more processors to perform the methods described in further detail herein. For example, as shown, memory 620 includes instructions for MVLM module 630 that may be used to implement and/or emulate the systems and models, and/or to implement any of the methods described further herein. An MVLM module 630 may receive input 640 such as an input training data (e.g., image-text pairs) via the data interface 615 and generate an output 650 which may be image captions or classification labels. Examples of the input data may include images. Examples of the output data may include text captions.

The data interface 615 may comprise a communication interface, a user interface (such as a voice input interface, a graphical user interface, and/or the like). For example, the computing device 600 may receive the input 640 (such as a training dataset) from a networked database via a communication interface. Or the computing device 600 may receive the input 640, such as images, from a user via the user interface.

In some embodiments, the vision-language module 630 is configured to pretrain the module 630 for various vision-language tasks. The vision-language module 630 may further include an image encoder 631 (e.g., similar to 110 in FIGS. 1-5), a query Transformer 632 (e.g., similar to 120 in FIGS. 1-5), an LLM encoder submodule 633 (e.g., similar to 130*a* in FIG. 4B), and an LLM decoder submodule 634 (e.g., similar to 130*b* in FIG. 4B). In one embodiment, the MVLM module 630 and its submodules 631 may be implemented by hardware, software and/or a combination thereof.

In one embodiment, the vision-language module 630 and one or more of its submodules 631-634 may be implemented via an artificial neural network. The neural network comprises a computing system that is built on a collection of connected units or nodes, referred as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 620 as a structure of layers of neurons, and parameters describing the non-linear transformation at each neuron and the weights associated with edges connecting the neurons. An example neural network may be a Transformer network, and/or the like.

In one embodiment, the neural network-based vision-language module 630 and one or more of its submodules 631-634 may be trained by updating the underlying parameters of the neural network based on a loss. For example, a loss (such as any of the ITC loss, ITM loss and ITG loss discussed in relation to FIG. 2) is a metric that evaluates how far away a neural network model generates a predicted output value from its target output value (also referred to as the "ground-truth" value). Given the loss computed, the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to the target output value.

Some examples of computing devices, such as computing device 600 may include non-transitory, tangible, machine readable media that include executable code that when run by one or more processors (e.g., processor 610) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 7:
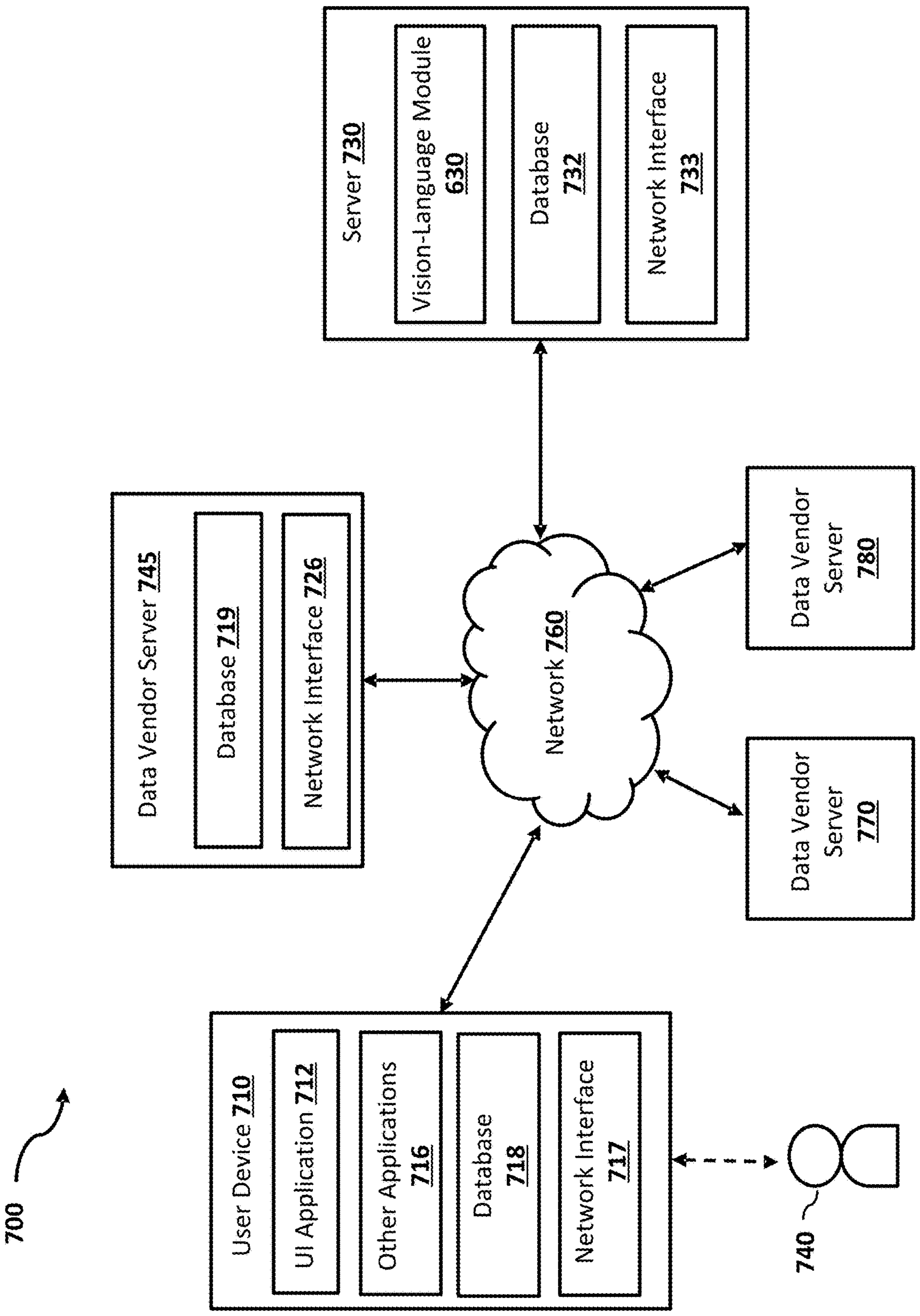
FIG. 7 is a simplified block diagram of a networked system suitable for implementing the multimodal vision-language model framework described in FIGS. 1-5 and other embodiments described herein.

FIG. 7 is a simplified block diagram of a networked system suitable for implementing the multimodal vision-language model framework described in FIGS. 7-5 and other embodiments described herein. In one embodiment, block diagram 700 shows a system including the user device 710 which may be operated by user 740, data vendor servers 745, 770 and 780, server 730, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 7 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 710, data vendor servers 745, 770 and 780, and the server 730 may communicate with each other over a network 760. User device 710 may be utilized by a user 740 (e.g., a driver, a system admin, etc.) to access the various features available for user device 710, which may include processes and/or applications associated with the server 730 to receive an output data anomaly report.

User device 710, data vendor server 745, and the server 730 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 700, and/or accessible over network 760.

User device 710 may be implemented as a communication device that may utilize appropriate hardware and software configured for wired and/or wireless communication with data vendor server 745 and/or the server 730. For example, in one embodiment, user device 710 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 710 of FIG. 7 contains a user interface (UI) application 712, and/or other applications 716, which may correspond to executable processes, procedures, and/or applications with associated hardware. For example, the user device 710 may receive a message indicating a caption has been generated, or an answer to a guided question with respect to an image, etc. from the server 730 and display the message via the UI application 712. In other embodiments, user device 710 may include additional or different modules having specialized hardware and/or software as required.

In various embodiments, user device 710 includes other applications 716 as may be desired in particular embodiments to provide features to user device 710. For example, other applications 716 may include security applications for implementing client-side security features, programmatic client applications for interfacing with appropriate application programming interfaces (APIs) over network 760, or other types of applications. Other applications 716 may also include communication applications, such as email, texting, voice, social networking, and IM applications that allow a user to send and receive emails, calls, texts, and other notifications through network 760. For example, the other application 716 may be an email or instant messaging application that receives a message from the server 730. Other applications 716 may include device interfaces and other display modules that may receive input and/or output information. For example, other applications 716 may contain software programs for asset management, executable by a processor, including a graphical user interface (GUI) configured to provide an interface to the user 740 to view generated captions or classification outputs.

User device 710 may further include database 718 stored in a transitory and/or non-transitory memory of user device 710, which may store various applications and data and be utilized during execution of various modules of user device 710. Database 718 may store user profile relating to the user 740, predictions previously viewed or saved by the user 740, historical data received from the server 730, and/or the like. In some embodiments, database 718 may be local to user device 710. However, in other embodiments, database 718 may be external to user device 710 and accessible by user device 710, including cloud storage systems and/or databases that are accessible over network 760.

User device 710 includes at least one network interface component 717 adapted to communicate with data vendor server 745 and/or the server 730. In various embodiments, network interface component 717 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 745 may correspond to a server that hosts database 719 to provide training datasets including image, text, or image-text pairs to the server 730. The database 719 may be implemented by one or more relational database, distributed databases, cloud databases, and/or the like.

The data vendor server 745 includes at least one network interface component 726 adapted to communicate with user device 710 and/or the server 730. In various embodiments, network interface component 726 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 745 may send asset information from the database 719, via the network interface 726, to the server 730.

The server 730 may be housed with the vision-language module 630 and its submodules described in FIG. 6. In some implementations, the vision-language module 630 may receive data from database 719 at the data vendor server 745 via the network 760 to generate image captions or classification outputs. The generated image captions or classification outputs may also be sent to the user device 710 for review by the user 740 via the network 760.

The database 732 may be stored in a transitory and/or non-transitory memory of the server 730. In one implementation, the database 732 may store data obtained from the data vendor server 745. In one implementation, the database 732 may store parameters of the MVLM module 130. In one implementation, the database 732 may store previously generated captions and/or classifications, and the corresponding input feature vectors.

In some embodiments, database 732 may be local to the server 730. However, in other embodiments, database 732 may be external to the server 730 and accessible by the server 730, including cloud storage systems and/or databases that are accessible over network 760.

The server 730 includes at least one network interface component 733 adapted to communicate with user device 710 and/or data vendor servers 745, 770 or 780 over network 760. In various embodiments, network interface component 733 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 760 may be implemented as a single network or a combination of multiple networks. For example, in various embodiments, network 760 may include the Internet or one or more intranets, landline networks, wireless networks, and/or other appropriate types of networks. Thus, network 760 may correspond to small scale communication networks, such as a private or local area network, or a larger scale network, such as a wide area network or the Internet, accessible by the various components of system 700.

Example Work Flows

Figure 8:
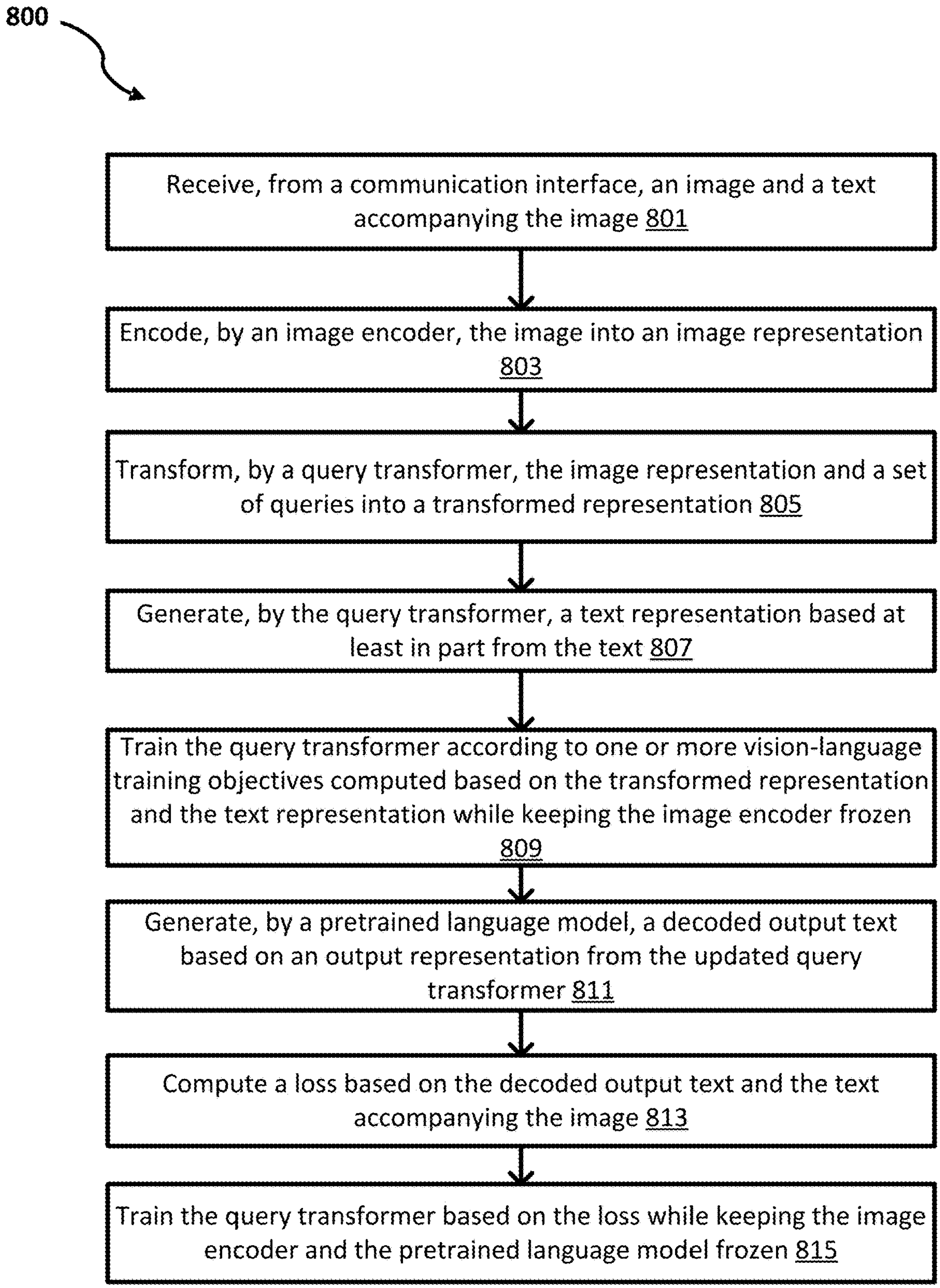
FIG. 8 is an example logic flow diagram illustrating a method of pre-training a multimodal framework for vision-language tasks based on the framework shown in FIGS. 1-7, according to some embodiments described herein

FIG. 8 is an example logic flow diagram illustrating a method of pre-training a multimodal framework for vision-language tasks based on the framework shown in FIGS. 1-7, according to some embodiments described herein. One or more of the processes of method 800 may be implemented, at least in part, in the form of executable code stored on non-transitory, tangible, machine-readable media that when run by one or more processors may cause the one or more processors to perform one or more of the processes. In some embodiments, method 800 corresponds to the operation of the vision-language module 630 (e.g., FIGS. 6-7).

As illustrated, the method 800 includes a number of enumerated steps, but aspects of the method 800 may include additional steps before, after, and in between the enumerated steps. In some aspects, one or more of the enumerated steps may be omitted or performed in a different order.

At step 801, an image (e.g., 105*a* in FIG. 2) and a text (e.g., 105*b* in FIG. 2) accompanying the image may be received from a communication interface (e.g., data interface 615 in FIG. 6, network interface 733 in FIG. 7).

At step 803, an image encoder (e.g., 110 in FIGS. 1-2) may encode the image into an image representation.

At step 805, a query transformer (e.g., 120 in FIGS. 1-2) may transform the image representation and a set of queries (e.g., 106 in FIG. 2) into a transformed representation (e.g., the query embeddings Z). For example, one or more attention layers of an image transformer that generate query embeddings from the set of queries. At step 807, the query transformer may generate a text representation based at least in part from the text. At step 809, the query transformer may be trained according to one or more vision-language training objectives computed based on the transformed representation and the text representation while keeping the image encoder frozen. For example, in one implementation, one or more vision-language training objectives comprises an image-text matching objective (e.g., see ITM module 231). A self-attention mask (e.g., 230 in FIG. 2) is applied between the set of queries (e.g., 106 in FIG. 0.2) and the text (e.g., 105*b* in FIG. 2) to generate the query embeddings. A classifier head may generate a match prediction indicating whether the image and the text are a matching pair based on the query embeddings. Then the image-text matching objective is computed based on the match prediction and a ground truth.

For another example, the one or more vision-language training objectives comprises an image-text contrastive learning objective (e.g., ITC module 232 in FIG. 2). An image-text similarity may be computed based on the query embeddings and the text representation. The image-text contrastive learning objective may then be computed based on the image-text similarity.

For another example, the one or more vision-language training objectives comprises an image-grounded text generation objective (e.g., see ITG module 233 in FIG. 2). A multi-modal self-attention mask may be applied to the set of queries (e.g., 106 in FIG. 2) and the text (e.g., 105*b* in FIG. 2). A predicted text may be generated conditioned on image features based on the applied multi-modal self-attention mask. The image-grounded text generation objective may be computed based on the predicted text and the text.

At step 811, a pretrained language model (e.g., LLM 130 in FIGS. 1-2) may generate a decoded output text (e.g., 415 in FIG. 4A or 416 in FIG. 4B) based on an output representation from the updated query transformer. For example, the pretrained language model includes a text decoder (e.g., 130*b* in FIG. 4A), and a fully connected layer (e.g., 410 in FIG. 4A) projects the output representation to a same dimension with the pretrained language model. The text decoder generates the decoded output text based on the projected output representation.

For another example, the pretrained language model includes a text encoder (e.g., 130*a* in FIG. 4B) and a text decoder (e.g., 130*b* in FIG. 4B). A fully connected layer may project the output representation to a same dimension with the pretrained language model. The text encoder may encode the projected output representation prepended to a prefix text into a prefix representation. The text decoder may decode a suffix text from the prefix representation. The prefix text and the suffix text may be concatenated into the decoded output text.

At step 813, a loss is computed based on the decoded output text and the text accompanying the image. For example, the loss may be a language modeling loss.

At step 815, the query transformer may be trained based on the loss while keeping the image encoder and the pretrained language model frozen.

In one embodiment, the pretraining method 800 may be implemented 250*k* steps in the first stage (e.g., steps 801-809) and 80*k* steps in the second stage (e.g., steps 811-815). A batch size of 2320/1680 for ViT-L/ViT-G in the first stage and a batch size of 1920/1520 for OPT/FlanT5 in the second stage. During pre-training, the frozen ViTs' and LLMs' parameters are converted into FP16, except for FlanT5 where BFloat16 is used. Due to the use of frozen models, pre-training method 800 is more computational friendly than existing large-scale VLP methods. For example, using a single 16-A100(40G) machine, the largest model with ViT-G and FlanT5-XXL requires less than 6 days for the first stage and less than 3 days for the second stage.

The same set of pre-training hyper-parameters are used for all models. For example, the AdamW optimizer with $\beta1=0.9$, $\beta1=0.98$, and a weight decay of 0.05 is used. A cosine learning rate decay with a peak learning rate of 1e-4 and a linear warmup of 2 k steps. The minimum learning rate at the second stage is 5e-5. An images of size 224×224, augmented with random resized cropping and horizontal flipping may be adopted.

FIG. 9 is an example logic flow diagram illustrating a method of zero-shot vision-language tasks based on the framework shown in FIGS. 1-7, according to some embodiments described herein. One or more of the processes of method 800 may be implemented, at least in part, in the form of executable code stored on non-transitory, tangible, machine-readable media that when run by one or more processors may cause the one or more processors to perform one or more of the processes. In some embodiments, method 800 corresponds to the operation of the vision-language module 630 (e.g., FIGS. 6-7).

As illustrated, the method 800 includes a number of enumerated steps, but aspects of the method 800 may include additional steps before, after, and in between the enumerated steps. In some aspects, one or more of the enumerated steps may be omitted or performed in a different order.

At step 901, an input image (e.g., 115 in FIG. 5) and an input utterance (e.g., 116 in FIG. 5) relating to the input image may be received from a communication interface. For example, the input utterance indicates an expected output text to generate based on visual content of the image, such as but not limited to a question relating to visual content of the input image, a guided request on what to generate about the image and/or the like.

At step 903, an image encoder (e.g., 110 in FIG. 5) may encode the input image into an image representation.

At step 905, a query transformer (e.g., 120 in FIG. 5) may transform the image representation and a set of queries into a transformed representation.

At step 907, a pretrained language model (e.g., 130 in FIG. 5) may generate a combined representation from a combination of the transformed representation and the input utterance. For example, the pretrained language model includes a text decoder, and the text decoder receives an input which combines the transformed representation and tokens of the input utterance. For another example, the pretrained language model includes a text encoder and a text decoder. The text encoder encodes a combination of the transformed representation, the input text, and a prefix text into the combined representation. The text decoder decodes a suffix text from the combined representation. The prefix text and the suffix text are concatenated into the decoded output text.

In one implementation, a fully connected layer projects the transformed representation to the same dimension with the pretrained language model before feeding the transformed representation to the pretrained language model.

At step 909, the pretrained language model may generate a decoded output text (e.g., 118 in FIG. 5) based on the combined representation.

At step 911, a response is presented via the communication interface based on the decoded output text in response to the input utterance.

Specifically, the query transformer is trained with a training dataset of images and accompanying texts while the image encoder and the pretrained language model are kept frozen during training. The training dataset of images and accompanying texts does not correspond to a particular vision-language task. Thus, method 900 may achieve any vision language task in a zero-shot setting.

Example Data Experiment Performance

FIG. 10 provide additional examples of zero-shot image-to-text generation using the framework illustrated in FIG. 5, according to embodiments described herein. ViT-G is used as the image encoder and FlanT5XXL is used as the language model. The examples show a wide range of capabilities including visual conversation, visual knowledge reasoning, visual commonsense reasoning, storytelling, and personalized image-to-text generation.

Table 1 in FIG. 11 provides an overview of the performance of the vision-language framework (referred to as "bootstrapping language-image pretraining (BLIP-2)") on various zero-shot vision-language tasks. Example existing vision-language models that are compared with BLIP-2 in Table 1 include BLIP (described in co-pending and commonly-owned U.S. application Ser. No. 17/745,540), SimVLM (Wang et al., SimVLM: Simple visual language model pretraining with weak supervision, arXiv preprint arXiv:2108.10904, 2021), BEIT-3 (Wang et al., Image as a foreign language: Beit pretraining for all vision and vision-language tasks, arXiv:2208.10442, 2022), and Flamingo (Alayrac et al., Flamingo: a visual language model for few-shot learning, arXiv preprint arXiv:2204.14198, 2022). Compared to previous state-of-the-art models, BLIP-2 achieves improved performance while requiring substantially fewer number of trainable parameters during vision-language pre-training BLIP-2 effectively enables a LLM to understand images while preserving its capability in following text prompts, which allows us to control image-to-text generation with instructions. The text prompt is prepended after the visual prompt as input to the LLM.

For zero-shot visual question answering (VQA), quantitative evaluation is performed on the zero-shot visual question answering task. For OPT models, the prompt "Question: { } Answer:" is adopted. For FlanT5 models, the prompt "Question: { } Short answer:" is adopted. During generation, beam search with a beam size of 5 is used. The length-penalty is set to −1 which encourage shorter answers that align better with human annotation.

Table 2 in FIG. 12 compares BLIP-2 to a variety of baseline models including Few VLM (Jin et al., A good prompt is worth millions of parameters: Low-resource prompt-based learning for vision-language models, in proceedings of ACL, pp. 2763-2775, 2022), Frozen (Tsimpoukelli et al., Multimodal few-shot learning with frozen language models, in proceedings of NeurIPS, pp. 200-212, 2021), VLKD (Dai et al., Enabling multimodal generation on CLIP via vision-language knowledge distillation, in proceedings of ACL Findings, pp. 2383-2395, 2022), and Flamingo 3B/9B/80B.

BLIP-2 achieves comparable result on the VQAv2 (Goyal et al., Making the V in VQA matter: Elevating the role of image understanding in visual question answering, in proceedings of CVPR, pp. 6325-6334, 2017) and GQA (Hudson et al., GQA: A new dataset for real-world visual reasoning and compositional question answering. In CVPR, pp. 6700-6709, 2019) datasets. It outperforms Flamingo80B by 8.7% on VQAv2, despite having 54× fewer trainable parameters. On the OK-VQA (Marino et al., OK-VQA: A visual question answering benchmark requiring external knowledge, in proceedings of CVPR, 2019) dataset, BLIP-2 comes secondary to Flamingo80B.

Table 2 shows that a stronger image encoder or a stronger LLM both lead to better performance. This observation is supported by several facts: (1) ViT-G outperforms ViT-L for both OPT and FlanT5. (2) Within the same LLM family, larger models outperform smaller ones. (3) FlanT5, an instruction-tuned LLM, outperforms the unsupervised-trained OPT on VQA. This observation validates BLIP-2 as a generic vision-language pre-training method that can efficiently harvest the rapid advances in CV and NLP communities.

Figure 13:
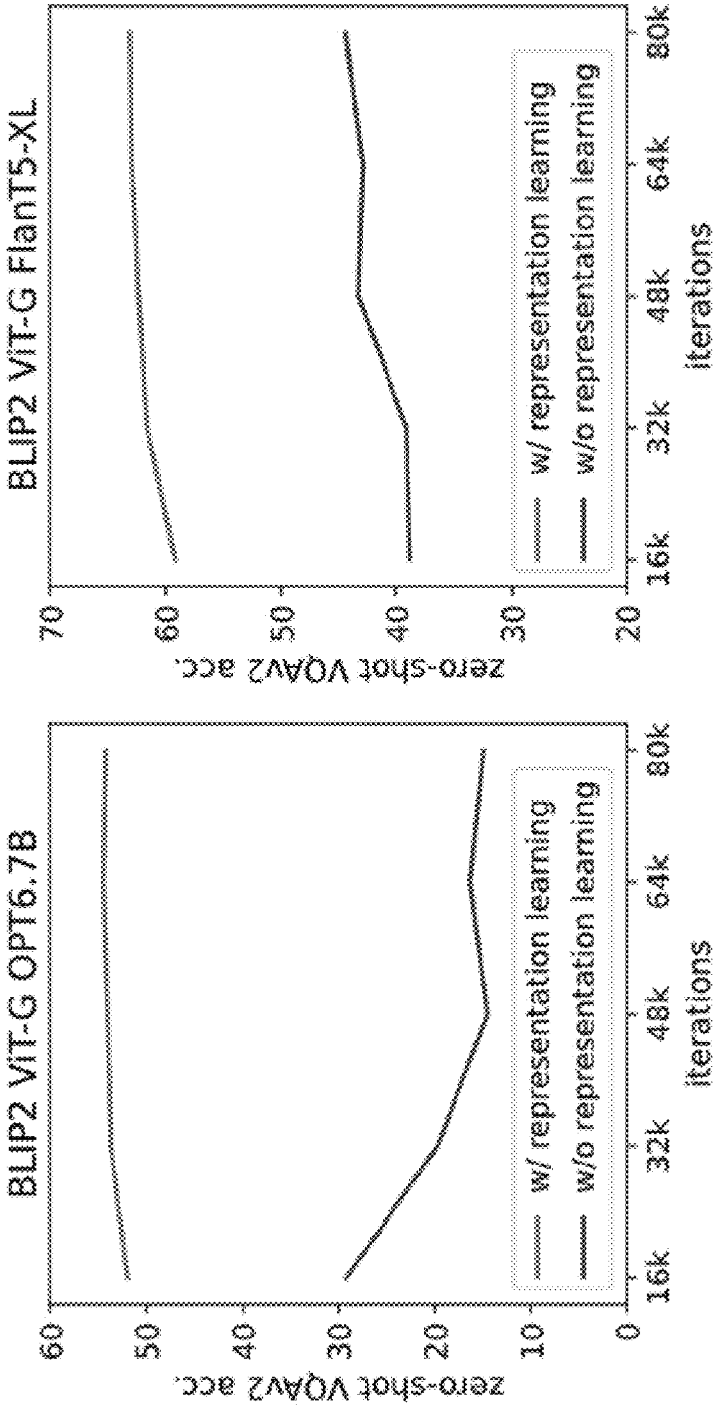

In the data experiments, the first-stage representation learning pre-trains the Q-Former 120 to learn visual features relevant to the text, which reduces the burden of the LLM to learn vision-language alignment. Without the representation learning stage, Q-Former relies solely on the vision-to-language generative learning to bridge the modality gap, which is similar to the Perceiver Resampler in Flamingo. FIG. 13 shows the effect of representation learning on generative learning. Without representation learning, both LLMs demonstrate substantially lower performance on zero-shot VQA. In particular, OPT suffers from catastrophic forgetting where performance drastically degrades as training proceeds.

For Visual Question Answering tasks, given annotated data, BLIP-2 can be further adapted to the VQA task by finetuning the parameters of the Q-Former 120 and the image encoder 110 (while keeping the LLM's parameters frozen). Finetuned with the open-ended answer generation loss, the LLM 130 receives Q-Former's output and the question as input, and is asked to generate the answer. In order to extract image features that are more relevant to the question, Q-Former is additionally conditioned on the question. Specifically, the question tokens are given as input to the Q-Former and interact with the queries via the self-attention layers, which can guide the cross-attention layers to focus on more informative image regions.

Following BLIP, the VQA data includes the training and validation splits from VQAv2, as well as training samples from Visual Genome. In FIG. 14, BLIP-2 is compared with baseline models finetuned for VQA. Example existing models for comparison include ALBEF (Li et al., Align before fuse: Vision and language representation learning with momentum distillation, in proceedings of NeurIPS, 2021), BLIP, OFA, Flamingo80B, SimVLM, CoCa (Yu et al., Coca: Contrastive captioners are image-text foundation models, arXiv preprint arXiv:2205.01917, 2022), and BEIT-3.

BLIP-2 models are also tested for the image captioning task, which asks the model to generate a text description for the image's visual content. The prompt "a photo of" as an initial input to the LLM and trains the model to generate the caption with the language modeling loss. The LLM is kept frozen during finetuning, and the parameters of the Q-Former are updated together with the image encoder. Experiments with ViT-G and various LLMs are done. Finetuning is performed on COCO, and evaluated on both COCO test set and zero-shot transfer to NoCaps (Agrawal et al., Nocaps: novel object captioning at scale, in proceedings of International Conference on Computer Vision (ICCV), pp. 8947-8956, 2019) validation set.

The results are shown in FIG. 15. Example existing models for comparison with BLIP-2 include OSCAR (Li et al., Oscar: Object-semantics aligned pre-training for vision-language tasks, in proceedings of ECCV, pp. 121-137, 2020), VinVL (Zhang et al., Vinyl: Making visual representations matter in vision-language models, arXiv prepriarXiv: 2101.00529, 2021), BLIP, OFA (Wang et al., OFA: unifying architectures, tasks, and modalities through a simple sequence-to-sequence learning framework, in proceedings of ICML, pp. 23318-23340, 2022), Flamingo and SimVLM. BLIP-2 achieves comparable or superior performance with significant improvement on NoCaps over existing methods, demonstrating strong generalization ability to out-domain images.

Image-Text Retrieval task does not involve language generation, which can be directly finetuned with the first-stage-pretrained model without an LLM. Specifically, the image encoder is finetuned together with Q-Former on COCO using the same objectives (i.e. ITC, ITM, and ITG) as pre-training. The model is then evaluated for both image-to-text retrieval and text-to-image retrieval on COCO and Flickr30K (Plummer et al., Flickr30k entities: Collecting region-to-phrase correspondences for richer image-to-sentence models, in proceedings of ICCV, pp. 2641-2649, 2015) datasets. During inference, first select k=128 candidates based on the image-text feature similarity, followed by a re-ranking based on pairwise ITM scores. Experiments with both ViT-L and ViT-G as the image encoder are performed.

The results are shown in FIG. 16. BLIP-2 achieves comparable or superior performance with significant improvement over existing methods on zero-shot image-text retrieval. Example existing models for comparison in FIG. 16 include CLIP, Align (Jia et al., Scaling up visual and vision-language representation learning with noisy text supervision. arXiv preprint arXiv:2102.05918, 2021), FILIP (Yao et al., FILIP: fine-grained interactive language-image pre-training, in proceedings of ICLR, 2022), Florence (Yuan et al., Florence: A new foundation model for computer vision, arXiv preprint arXiv:2111.11432, 2021), BEIT-3, UNITER (Chen et al, UNITER: universal image-text representation learning, in proceedings of ECCV, volume 12375, pp. 104-120, 2020), OSCAR, VinVL, ALBEF and BLIP.

The ITC and ITM losses are important for image-text retrieval as they directly learn image-text similarity.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of a multimodal framework for vision-language tasks, the method comprising:

receiving, at a user interface and at the multimodal framework comprising an image encoder, a query transformer, and a pretrained language model, an input image and an input utterance instructing a task relating to the input image;

encoding, by the image encoder, the input image into an image representation;

transforming, by the query transformer connected to an output of the image encoder, the image representation and a set of query vectors to extract visual features from the image representation into a single transformed representation, wherein the query transformer comprises a self-attention layer to generate a self-attention output from the set of query vectors and a cross-attention layer connected to an output of the self-attention layer and the output of the image encoder to generate a cross-attention output from the image representation and the self-attention output;

generating, by the pretrained language model, a single combined representation from a first input of the single transformed representation from the query transformer and a second input of the input utterance;

generating, by the pretrained language model, a decoded output text based on the single combined representation; and presenting, via the user interface, a response based on the decoded output text in response to the input utterance.

2. The method of claim 1, wherein the input utterance indicates an expected output text to generate based on visual content of the input image.

3. The method of claim 1, wherein the pretrained language model includes a text decoder, and wherein the text decoder receives an input which combines the single transformed representation and tokens of the input utterance.

4. The method of claim 1, wherein the pretrained language model includes a text encoder and a text decoder, and wherein the single combined representation is generated by:

encoding, via the text encoder, a combination of the single transformed representation, the input text, and a prefix text into the single combined representation;

decoding, via the text decoder, a suffix text from the single combined representation; and concatenating the prefix text and the suffix text into the decoded output text.

5. The method of claim 1, further comprising:

projecting, via a fully connected layer, the single transformed representation to a same dimension with the pretrained language model before feeding the single transformed representation to the pretrained language model.

6. The method of claim 1, wherein the decoded output text is generated token by token by the pretrained language model conditioned on previously generated tokens.

7. The method of claim 1, wherein the query transformer includes a fewer number of parameters compared to the image encoder or the pretrained language model.

8. The method of claim 1, wherein the query transformer is trained with a training dataset of images and accompanying texts while the image encoder and the pretrained language model are kept frozen during training, and wherein the training dataset of images and accompanying texts does not correspond to a particular vision-language task.

9. A system of a multimodal framework for vision-language tasks, the system comprising:

a user interface receiving an input image and an input utterance instructing a task relating to the input image;

a memory storing a multimodal framework comprising an image encoder, a query transformer, a pretrained language model and a plurality of processor-executable instructions; and one or more processors executing the instructions to perform operations including:

encoding, by the image encoder, the input image into an image representation;

transforming, by the query transformer connected to an output of the image encoder, the image representation and a set of query vectors to extract visual features from the image representation into a single transformed representation, wherein the query transformer comprises a self-attention layer to generate a self-attention output from the set of query vectors and a cross-attention layer connected to an output of the self-attention layer and the output of the image encoder to generate a cross-attention output from the image representation and the self-attention output;

generating, by the pretrained language model, a single combined representation from a first input of the single transformed representation from the query transformer and a second input of the input utterance;

generating, by the pretrained language model, a decoded output text based on the single combined representation; and presenting, via the user interface, a response based on the decoded output text in response to the input utterance.

10. The system of claim 9, wherein the input utterance indicates an expected output text to generate based on visual content of the input image.

11. The system of claim 9, wherein the pretrained language model includes a text decoder, and wherein the text decoder receives an input which combines the single transformed representation and tokens of the input utterance.

12. The system of claim 9, wherein the pretrained language model includes a text encoder and a text decoder, and wherein the single combined representation is generated by:

encoding, via the text encoder, a combination of the single transformed representation, the input text, and a prefix text into the single combined representation;

decoding, via the text decoder, a suffix text from the single combined representation; and concatenating the prefix text and the suffix text into the decoded output text.

13. The system of claim 9, wherein the operations further comprise:

projecting, via a fully connected layer, the single transformed representation to a same dimension with the pretrained language model before feeding the single transformed representation to the pretrained language model.

14. The system of claim 9, wherein the decoded output text is generated token by token by the pretrained language model conditioned on previously generated tokens.

15. The system of claim 9, wherein the query transformer includes a fewer number of parameters compared to the image encoder or the pretrained language model.

16. The system of claim 9, wherein the query transformer is trained with a training dataset of images and accompanying texts while the image encoder and the pretrained language model are kept frozen during training, and wherein the training dataset of images and accompanying texts does not correspond to a particular vision-language task.

17. A non-transitory processor-readable storage medium storing a plurality of processor-executable instructions for a multimodal framework for vision-language tasks, the instructions being executed by one or more processors to perform operations comprising:

receiving, at a user interface and at the multimodal framework comprising an image encoder, a query transformer, and a pretrained language model, an input image and an input utterance instructing a task relating to the input image;

encoding, by the image encoder, the input image into an image representation;

transforming, by the query transformer connected to an output of the image encoder, the image representation and a set of query vectors to extract visual features from the image representation into a single transformed representation, wherein the query transformer comprises a self-attention layer to generate a self-attention output from the set of query vectors and a cross-attention layer connected to an output of the self-attention layer and the output of the image encoder to generate a cross-attention output from the image representation and the self-attention output;

generating, by the pretrained language model, a single combined representation from a first input of the single transformed representation from the query transformer and a second input of the input utterance;

generating, by the pretrained language model, a decoded output text based on the single combined representation; and presenting, via the user interface, a response based on the decoded output text in response to the input utterance.

18. The non-transitory processor-readable storage medium of claim 17, wherein the input utterance indicates an expected output text to generate based on visual content of the input image.

19. The non-transitory processor-readable storage medium of claim 17, wherein the pretrained language model includes a text decoder, and wherein the text decoder receives an input which combines the single transformed representation and tokens of the input utterance.

20. The non-transitory processor-readable storage medium of claim 17, wherein the query transformer is trained with a training dataset of images and accompanying texts while the image encoder and the pretrained language model are kept frozen during training, and} wherein the training dataset of images and accompanying texts does not correspond to a particular vision-language task.

* * * * *